United States Patent [19]

Nakaguchi et al.

[11] Patent Number: 5,318,931
[45] Date of Patent: Jun. 7, 1994

[54] GLASS PANES FOR VEHICLES

[75] Inventors: Kunio Nakaguchi; Yoshikazu Toshikiyo; Takashi Sunada, all of Osaka, Japan

[73] Assignee: Nippon Sheet Glass Co., Ltd., Osaka, Japan

[21] Appl. No.: 832,582

[22] Filed: Feb. 7, 1992

[30] Foreign Application Priority Data

Feb. 8, 1991 [JP] Japan ................... 3-39438

[51] Int. Cl.$^5$ ............................... C03C 4/08
[52] U.S. Cl. ........................ 501/64; 501/27; 501/55; 501/66; 501/68; 501/69; 501/70; 501/71; 501/904; 501/905
[58] Field of Search ............ 501/27, 55, 64, 66, 501/68, 69, 70, 71, 904, 905

[56] References Cited

U.S. PATENT DOCUMENTS

| | | | |
|---|---|---|---|
| 2,860,059 | 11/1958 | Molter et al. | |
| 3,296,004 | 1/1967 | Duncan | 501/71 |
| 3,300,323 | 1/1967 | Plumat et al. | 501/71 |
| 3,723,142 | 3/1973 | Kato et al. | 501/71 |
| 4,101,705 | 7/1978 | Fischer et al. | 428/220 |
| 4,104,076 | 8/1978 | Pons | 501/71 |
| 4,792,536 | 12/1988 | Pecoraro et al. | 501/70 |
| 4,866,010 | 9/1989 | Boulos et al. | 501/71 |

FOREIGN PATENT DOCUMENTS

| | | |
|---|---|---|
| 0297404 | 1/1989 | European Pat. Off. |
| 2074983 | 10/1971 | France |
| 2071082 | 9/1981 | United Kingdom |
| 2252973 | 8/1992 | United Kingdom |

*Primary Examiner*—Anthony Green
*Assistant Examiner*—Michael Marcheschi
*Attorney, Agent, or Firm*—Sughrue, Mion, Zinn, Macpeak & Seas

[57] ABSTRACT

Glass for vehicles comprising from 65 to 80% by weight of $SiO_2$, from 0 to 5% by weight of $Al_2O_3$, from 0 to 5% by weight $B_2O_3$, from 0 to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 20% by weight in total of $Na_2O$ and $K_2O$, from 0.1 to 1% by weight of cerium oxide in terms of $CeO_2$, from 0.2 to 0.6% by weight of iron oxide in terms of $Fe_2O_3$, from 0 to 0.005% by weight of CoO, from 0 to 0.01% by weight of NiO, and from 0.0005 to 0.005% by weight of Se, and glass for vehicles comprising from 65 to 80% by weight of $SiO_2$, from 0 to 5% by weight of $Al_2O_3$, from 0 to 5% by weight of $B_2O_3$, from to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 18% by weight in total of $Na_2O$ and $K_2O$, from 0.1 to 1% by weight of cerium oxide in terms of $CeO_2$, from 0 to 1% by weight of $TiO_2$, from 0.2 to 0.6% by weight of iron oxide in terms of $Fe_2O_3$, from 0 to 0.005% by weight of CoO, from 0 to 0.01% by weight of NiO, and from 0.0005 to 0.005% by weight of Se. The glass is gray-tinted while exhibiting excellent ultraviolet and heat absorption.

8 Claims, No Drawings

GLASS PANES FOR VEHICLES

FIELD OF THE INVENTION

The present invention relates to glass (pane) for vehicles, particularly automobiles. More particularly, it relates to gray-tinted glass for vehicles excellent in ultraviolet and heat ray absorption.

BACKGROUND OF THE INVENTION

Colored glass which has been used as window glass of vehicles includes blue-tinted glass containing $Fe_2O_3$ doped with CoO, green-tinted glass having a higher $Fe_2O_3$ content than blue-tinted glass to have improved heat ray absorption, and gray-tinted or bronzed glass containing $Fe_2O_3$, CoO, NiO, and Se as colorants.

While blue-tinted and green-tinted glass having a relatively high $Fe_2O_3$ content has relatively high heat and ultraviolet absorbing power, there still is an eagerness to protect interior trim from deterioration due to ultraviolet light with the recent trend to luxurious trim of automobiles. To cope with this demand, glass having high ultraviolet absorbing power while satisfying the requirements for energy saving has recently been developed. Having a higher $Fe_2O_3$ content than in conventional glass, this glass is also tinted in green.

On the other hand, gray-tinted or bronzed glass has been desired from considerations of designs of vehicles. However, having a lower $Fe_2O_3$ content than in blue-tinted glass, conventional gray-tinted or bronzed glass has insufficient ultraviolet and heat absorption for satisfying the eagerness to protect interior trim from ultraviolet deterioration. It has therefore been demanded to develop grain-tinted or bronzed glass having high ultraviolet and heat ray absorbing power.

The present inventors previously proposed gray heat-absorbing glass containing tin oxide as a reducing agent and thereby having a high heat ray absorption, but this glass is costly because tin oxide is expensive.

SUMMARY OF THE INVENTION

An object of the present invention is to solve the above-mentioned problems confronting the conventional glass for vehicles and to provide gray glass which has high ultraviolet and heat ray absorbing power and is suitable for use in vehicles.

Other objects and effects of the present invention will apparent from the following description.

The prevent invention relates to glass for vehicles comprising from 65 to 80% by weight of $SiO_2$, from 0 to 5% by weight of $Al_2O_3$, from 0 to 5% by weight of $B_2O_3$, from 0 to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 20% by weight in total of $Na_2O$ and $K_2O$, from 0.1 to 1% by weight of cerium oxide in terms of $CeO_2$, from 0.2 to 0.6% by weight of iron oxide in terms of $Fe_2O_3$ (total content of iron oxide calculated as $Fe_2O_3$), from 0 to 0.005% by weight of CoO, from 0 to 0.01% by weight of NiO, and from 0.0005 to 0.005% by weight of Se.

The prevent invention also relates to glass for vehicles comprising from 65 to 80% by weight of $SiO_2$, from 0 to 5% by weight of $Al_2O_3$, from 0 to 5% by weight of $B_2O_3$, from 0 to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 18% by weight in total of $Na_2O$ and $K_2O$, from 0.1 to 1% by weight of cerium oxide in terms of $CeO_2$, from 0 to 1% by weight of $TiO_2$, from 0.2 to 0.6% by width of iron oxide in terms of $Fe_2O_3$ (total content of iron oxide calculated as $Fe_2O_3$), from 0 to 0.005% by weight of CoO, from 0 to 0.01% by weight of NiO, and from 0.0005 to 0.005% by weight of Se.

DETAILED DESCRIPTION OF THE INVENTION

The glass for vehicles of the present invention preferably has, with a thickness of 4 mm, a visible light transmission of at least 70% with the CIE standard illuminant A, and a dominant wavelength of 570 nm or longer, particularly from 573 to 580 nm, with the CIE standard illuminant C.

The glass for vehicles of the present invention more preferably has, with a thickness of 4 mm, a solar radiation transmission of not more than 60%, particularly not more than 58%, a light transmission of not more than 10% at a wavelength of 350 nm, and an excitation purity of not more than 15% with the CIE standard illuminant C.

Concerning the contents of the components in the glass, the term "%" used hereinafter is % by weight.

$SiO_2$ is a basic ingredient of glass. If its content is less than 65%, the glass has reduced durability. If it exceeds 80%, the composition is difficult to melt. The content of $SiO_2$ is preferably from 68 to 73%.

$Al_2O_3$ serves to improve durability of glass. If its content exceeds 5%, the composition is difficult to melt. A preferred $Al_2O_3$ content is from 0.1 to 2%, and more preferably from 0.5 to 2%.

$B_2O_3$ is used, while not essential, for improvement of durability of glass and also as a melting aid. The upper limit of its content is 5%. $B_2O_3$ of higher content interferes with production of flat glass due to volatilization, etc. The content of $B_2O_3$ is preferably from 0 to 1%.

MgO and CaO both serve to improve durability of glass and to control liquidus temperature and viscosity at the time of glass forming. If the MgO content exceeds 10%, the liquidus temperature becomes high. If the CaO content is less than 5% or higher than 15%, the liquidus temperature becomes high. The contents of MgO and CaO are preferably from 1 to 6% and from 6 to 12%, respectively. If the total content of MgO and CaO is less than 5%, the resulting glass has deteriorated durability. If it exceeds 15%, the liquidus temperature becomes high. The total content of MgO and CaO is preferably from 8 to 14%.

$Na_2O$ and $K_2O$ are used as a glass melting accelerator. If the $Na_2O$ content is less than 10%, or if the total content of $Na_2O$ and $K_2O$ is less than 10%, the effect of accelerating melting is weak. If $Na_2O$ content exceeds 18%, or if the total content of $Na_2O$ and $K_2O$ exceeds 20%, durability is reduced. Since $K_2O$ is more expensive than $Na_2O$, it is used in an amount of 5% at most. The contents of $Na_2O$ and $K_2O$ are preferably from 11 to 15% and from 0 to 2%, respectively, and the total content of $Na_2O$ and $K_2O$ is preferably from 11 to 16%.

Cerium oxide in glass includes $CeO_2$ and $Ce_2O_3$, both of which exhibit ultraviolet absorbing power. If the cerium oxide content in terms of $CeO_2$ content is less than 0.1%, the ultraviolet absorbing effect is weak. If it exceeds 1%, the glass absorbs visible light to reduce the visible light transmission. The content of the cerium oxide is preferably from 0.3 to 1%.

TiO$_2$ is used, while not essential, as an ultraviolet absorber. If iron oxide coexists with TiO$_2$, the ultraviolet absorbing power is enhanced by the interaction between iron oxide and TiO$_2$. The amount of cerium oxide which is expensive, can be reduced by incorporating TiO$_2$, and thus the use of TiO$_2$ is also preferred in view of the production cost. If its content is more than 1% and iron oxide coexists, the glass absorbs the short wavelength region of visible light to reduce the visible light transmission.

Iron oxide in glass includes Fe$_2$O$_3$ and FeO. The former absorbs ultraviolet rays, and the latter absorbs heat rays. If the iron oxide content in terms of Fe$_2$O$_3$ content (total iron oxide content calculated as Fe$_2$O$_3$) is less than 0.2%, the effects of absorbing ultraviolet and heat rays are small. If it exceeds 0.6%, the visible light transmission is unfavorably reduced. The content of the iron oxide is preferably from 0.3 to 0.6%

The proportion of FeO is preferably from 23 to 35% by weight based on the total iron oxide. If the proportion of FeO is too large, the glass tends to be of reductive nature and difficult to be colored with selenium although the absorbing power of heat rays becomes large.

The content of FeO in the glass ([FeO] % by weight) is obtained from the following equation:

$$[FeO] = -0.25635 \times Log_{10}(T_{1000}/100) - 0.008$$

wherein $T_{1000}$% represents the light transmission at a wavelength of 1,000 nm of the glass. The proportion of FeO (R % by weight) based on the total iron oxide is obtained from the following equation:

$$R = 111.13 \times ([FeO]/[T\text{-}Fe_2O_3])$$

wherein [T-Fe$_2$O$_3$] % by weight represents the total iron oxide content in terms of Fe$_2$O$_3$ of the glass.

CoO has an absorption peak at around 600 nm and is therefore used for fine adjustment of the dominant wavelength of glass. If its content exceeds 0.005%, the visible light transmission is reduced.

NiO has an absorption peak at around 450 nm and is also used for fine adjustment of the dominant wavelength of glass. If its content exceeds 0.01%, the visible light transmission is reduced.

Both CoO and NiO function to reduce the visible light transmission and do not contribute to absorption of ultraviolet and heat rays. For the reason, it is preferred not to add these components.

Se is an essential component for neutralizing the green color of iron oxide-containing glass to thereby provide gray glass. If its content is less than 0.0005%, the color neutralizing effect is insubstantial. If it exceeds 0.005%, the visible light transmission of the resulting glass is unfavorably reduced. The content of Se is preferably from 0.0005 to 0.002%.

If desired, the glass according to the present invention may further contain the following optional components in addition to the above-mentioned components as long as the effects of the present invention are not impaired. That is, the glass may contain BaO, ZnO, TiO$_2$, or ZrO$_2$ in an amount of up to 1% by weight for the purpose of improving durability. The glass may also contain Li$_2$O or F as a melting aid in an amount of up to 1% by weight. Further, the glass may contain SO$_3$, As$_2$O$_3$, Sb$_2$O$_3$, or Cl as a fining agent in an amount of up to 1% by weight.

The present invention is now illustrated in greater detail by way of Examples and Comparative Example, but is not construed as being limited thereto. All parts, percents and the like are by weight unless otherwise indicated.

EXAMPLES 1 TO 23 AND COMPARATIVE EXAMPLE 1

Glass samples having the compositions shown in Tables 1 to 3 below were prepared as follows.

Silica sand, borax, feldspar, limestone, dolomite, soda ash, salt cake, carbon, titanium oxide, cerium oxide, red iron oxide, cobalt oxide, nickel oxide, and selenium were compounded according to the compositions of Tables 1 to 3, and the resulting batch was heat-melted in an electric furnace. The molten glass was cast and slowly cooled to room temperature. The cooled color glass was cut and polished to prepare a 4 mm thick specimen for determination of optical characteristics with a self-recording spectrophotometer Model 330, manufactured by Hitachi, Ltd.

Optical characteristics of each of the resulting specimen and, for comparison, bronzed glass conventionally employed for vehicles were determined at a view angle of 2° using the CIE standard illuminants A and C. The results obtained are shown in Tables 1 to 3.

TABLE 1

|  | Example 1 | Example 2 | Example 3 | Example 4 | Example 5 | Example 6 | Example 7 | Example 8 |
|---|---|---|---|---|---|---|---|---|
| Composition: | | | | | | | | |
| SiO$_2$ | 71.08 | 71.27 | 70.26 | 71.27 | 71.27 | 71.18 | 70.68 | 71.45 |
| B$_2$O$_3$ | 0 | 0 | 1.00 | 0 | 0 | 0 | 0.50 | 0 |
| Al$_2$O$_3$ | 1.50 | 1.50 | 1.50 | 1.50 | 1.50 | 1.50 | 1.50 | 1.50 |
| MgO | 4.00 | 4.00 | 4.00 | 4.00 | 4.00 | 4.00 | 4.00 | 4.00 |
| CaO | 8.00 | 8.00 | 8.00 | 8.00 | 8.00 | 8.00 | 8.00 | 8.00 |
| Na$_2$O | 13.50 | 13.50 | 13.50 | 13.50 | 13.50 | 13.50 | 13.50 | 13.50 |
| K$_2$O | 1.00 | 1.00 | 1.00 | 1.00 | 1.00 | 1.00 | 1.00 | 1.00 |
| CeO$_2$ | 0.50 | 0.40 | 0.40 | 0.40 | 0.40 | 0.45 | 0.45 | 0.30 |
| TiO$_2$ | 0 | 0 | 0 | 0 | 0 | 0 | 0 | 0 |
| [T-Fe$_2$O$_3$][1] | 0.42 | 0.33 | 0.33 | 0.33 | 0.33 | 0.37 | 0.37 | 0.25 |
| Fe$_2$O$_3$ | 0.298 | 0.236 | 0.233 | 0.241 | 0.236 | 0.262 | 0.264 | 0.178 |
| FeO | 0.110 | 0.085 | 0.087 | 0.080 | 0.085 | 0.097 | 0.095 | 0.065 |
| R[2] | 29.1 | 28.5 | 29.3 | 27.1 | 28.5 | 29.2 | 28.4 | 29.0 |
| CoO | 0 | 0 | 0 | 0.0005 | 0.0010 | 0 | 0 | 0 |
| NiO | 0 | 0 | 0.0050 | 0 | 0 | 0 | 0 | 0 |
| Se | 0.0013 | 0.0015 | 0.0010 | 0.0010 | 0.0008 | 0.0013 | 0.0010 | 0.0017 |
| Optical Characteristics: | | | | | | | | |
| T$_G$[3] (%) | 55.4 | 59.3 | 60.0 | 60.0 | 61.0 | 57.5 | 58.6 | 64.1 |
| Y$_A$[4] (%) | 70.3 | 70.3 | 71.6 | 71.4 | 73.0 | 70.9 | 73.3 | 70.7 |
| λ$_d$[5] (nm) | 575 | 578 | 575 | 574 | 571 | 576 | 574 | 580 |

TABLE 1-continued

|  | Example 1 | Example 2 | Example 3 | Example 4 | Example 5 | Example 6 | Example 7 | Example 8 |
|---|---|---|---|---|---|---|---|---|
| $P_e^{6)}$ (%) | 9.6 | 11.4 | 9.6 | 5.9 | 4.4 | 9.8 | 7.6 | 12.7 |
| $T_{UV}^{7)}$ (%) | 5.6 | 8.1 | 9.8 | 9.8 | 10.5 | 6.9 | 7.8 | 12.0 |

Note:
[1)] [T-Fe$_2$O$_3$]: Total content of iron oxide in terms of Fe$_2$O$_3$
[2)] R: Proportion of FeO in the total iron oxide
[3)] $T_G$: Solar radiation transmission, measured according to JIS R3208
[4)] $Y_A$: Visible light transmission (illuminant A), measured according to JIS Z8722
[5)] $\lambda_d$: Dominant wavelength (illuminant C), measured according to JIS Z8722
[6)] $P_e$: Excitation purity (illuminant C)
[7)] $T_{UV}$: Ultraviolet transmission at 350 nm

TABLE 2

|  | Example 9 | Example 10 | Example 11 | Example 12 | Example 13 | Example 14 | Comparative Example 1 |
|---|---|---|---|---|---|---|---|
| Composition: | | | | | | | |
| SiO$_2$ | 71.44 | 70.58 | 70.58 | 70.83 | 70.83 | 70.07 | 71.25 |
| B$_2$O$_3$ | 0 | 0 | 0 | 0 | 0 | 0 | 0 |
| Al$_2$O$_3$ | 1.50 | 1.50 | 1.50 | 1.50 | 1.50 | 1.50 | 1.52 |
| MgO | 4.00 | 4.00 | 4.00 | 4.00 | 4.00 | 4.00 | 3.85 |
| CaO | 8.00 | 8.00 | 8.00 | 8.00 | 8.00 | 8.00 | 8.92 |
| Na$_2$O | 13.50 | 13.50 | 13.50 | 13.50 | 13.50 | 13.50 | 13.31 |
| K$_2$O | 1.00 | 1.00 | 1.00 | 1.00 | 1.00 | 1.00 | 0.90 |
| CeO$_2$ | 0.30 | 1.00 | 1.00 | 0.75 | 0.75 | 0.75 | 0 |
| TiO$_2$ | 0 | 0 | 0 | 0 | 0 | 0 | 0 |
| [T-Fe$_2$O$_3$][1)] | 0.25 | 0.42 | 0.42 | 0.42 | 0.42 | 0.60 | 0.24 |
| Fe$_2$O$_3$ | 0.178 | 0.282 | 0.307 | 0.298 | 0.306 | 0.425 | 0.184 |
| FeO | 0.065 | 0.124 | 0.101 | 0.110 | 0.103 | 0.157 | 0.050 |
| R[2)] | 29.0 | 32.8 | 26.7 | 29.1 | 27.3 | 29.1 | 23.2 |
| CoO | 0.0010 | 0 | 0 | 0 | 0 | 0 | 0.0007 |
| NiO | 0.0050 | 0 | 0 | 0 | 0 | 0 | 0.0035 |
| Se | 0.0010 | 0.0013 | 0.0013 | 0.0013 | 0.0013 | 0.0018 | 0.0006 |
| Optical Characteristics: | | | | | | | |
| $T_G^{3)}$ (%) | 63.9 | 54.5 | 57.3 | 55.8 | 56.7 | 44.1 | 69.0 |
| $Y_A^{4)}$ (%) | 70.8 | 70.1 | 70.5 | 70.3 | 70.1 | 62.2 | 77.0 |
| $\lambda_d^{5)}$ (nm) | 576 | 576 | 577 | 576 | 577 | 575 | 576 |
| $P_e^{6)}$ (%) | 7.9 | 9.6 | 10.8 | 9.8 | 10.4 | 13.5 | 5.0 |
| $T_{UV}^{7)}$ (%) | 15.6 | 1.8 | 0.9 | 1.7 | 0.9 | 1.4 | 47.7 |

Note:
[1)] [T-Fe$_2$O$_3$]: Total content of iron oxide in terms of Fe$_2$O$_3$
[2)] R: Proportion of FeO in the total iron oxide
[3)] $T_G$: Solar radiation transmission, measured according to JIS R3208
[4)] $Y_A$: Visible light transmission (illuminant A), measured according to JIS Z8722
[5)] $\lambda_d$: Dominant wavelength (illuminant C), measured accordingj to JIS Z8722
[6)] $P_e$: Excitation purity (illuminant C)
[7)] $T_{UV}$: Ultraviolet transmission at 350 nm

TABLE 3

|  | Example 15 | Example 16 | Example 17 | Example 18 | Example 19 | Example 20 | Example 21 | Example 22 | Example 23 |
|---|---|---|---|---|---|---|---|---|---|
| Composition (% by weight): | | | | | | | | | |
| SiO$_2$ | 71.28 | 71.17 | 69.73 | 70.65 | 70.45 | 71.34 | 71.34 | 70.90 | 70.76 |
| B$_2$O$_3$ | 0 | 0 | 1.00 | 0 | 0.5 | 0 | 0 | 0 | 0 |
| Al$_2$O$_3$ | 1.50 | 1.50 | 1.50 | 1.50 | 1.50 | 1.50 | 1.50 | 1.50 | 1.50 |
| MgO | 4.00 | 4.00 | 4.00 | 4.00 | 4.00 | 4.00 | 4.00 | 4.00 | 4.00 |
| CaO | 8.00 | 8.00 | 8.00 | 8.00 | 8.00 | 8.00 | 8.00 | 8.00 | 8.00 |
| Na$_2$O | 13.50 | 13.50 | 13.50 | 13.50 | 13.50 | 13.50 | 13.50 | 13.50 | 13.50 |
| K$_2$O | 1.00 | 1.00 | 1.00 | 1.00 | 1.00 | 1.00 | 1.00 | 1.00 | 1.00 |
| CeO$_2$ | 0.27 | 0.18 | 0.60 | 0.80 | 0.20 | 0.14 | 0.16 | 0.40 | 0.26 |
| TiO$_2$ | 0.11 | 0.25 | 0.25 | 0.10 | 0.50 | 0.20 | 0.18 | 0.17 | 0.38 |
| [T-Fe$_2$O$_3$][1)] | 0.340 | 0.400 | 0.420 | 0.450 | 0.350 | 0.320 | 0.32 | 0.53 | 0.60 |
| Fe$_2$O$_3$ | 0.250 | 0.298 | 0.302 | 0.334 | 0.259 | 0.240 | 0.240 | 0.364 | 0.450 |
| FeO | 0.096 | 0.087 | 0.106 | 0.104 | 0.082 | 0.072 | 0.072 | 0.149 | 0.135 |
| R[2)] | 31.4 | 24.2 | 28.0 | 25.7 | 26.0 | 25.0 | 25.0 | 31.2 | 25.0 |
| CoO | 0 | 0 | 0 | 0 | 0 | 0.0008 | 0 | 0 | 0 |
| NiO | 0 | 0 | 0 | 0 | 0 | 0 | 0.005 | 0 | 0 |
| Se | 0.0013 | 0.0013 | 0.0013 | 0.0010 | 0.0010 | 0.0015 | 0.0015 | 0.0018 | 0.0015 |
| Optical Characteristics: | | | | | | | | | |
| $T_G^{3)}$ (%) | 55.9 | 56.4 | 56.1 | 56.4 | 59.1 | 57.0 | 56.4 | 45.2 | 45.3 |
| $Y_A^{4)}$ (%) | 70.0 | 70.1 | 70.0 | 70.2 | 70.0 | 67.4 | 67.0 | 62.3 | 62.0 |
| $\lambda_d^{5)}$ (nm) | 575 | 576 | 575 | 576 | 575 | 577 | 577 | 575 | 575 |
| $P_e^{6)}$ (%) | 10.3 | 11.5 | 12.9 | 11.3 | 10.1 | 10.4 | 13.7 | 14.1 | 15.9 |

TABLE 3-continued

| | Example 15 | Example 16 | Example 17 | Example 18 | Example 19 | Example 20 | Example 21 | Example 22 | Example 23 |
|---|---|---|---|---|---|---|---|---|---|
| $T_{UV}{}^{7)}$ (%) | 7.3 | 8.7 | 1.8 | 1.6 | 2.7 | 8.5 | 8.5 | 2.3 | 2.8 |

Note:
1) [T-Fe$_2$O$_3$]: Total content of iron oxide in terms of Fe$_2$O$_3$
2) R: Proportion of FeO in the total iron oxide
3) $T_G$: Solar radiation transmission, measured according to JIS R3208
4) $Y_A$: Visible light transmission (illuminant A), measured according to JIS Z8722
5) $\lambda_d$: Dominant wavelength (illuminant C), measured accordingj to JIS Z8722
6) $P_e$: Excitation purity (illuminant C)
7) $T_{UV}$: Ultraviolet transmission at 350 nm It can be seen from the results in Tables 1 to 3 that the glass according to the present invention is gray-tinted while having a high visible light transmission, a low solar radiation transmission, and a high ultraviolet absorption. Thus, the glass of the present invention is suitable for use in not only vehicles but also buildings. While the invention has been described in detail and with reference to specific examples thereof, it will be apparent to one skilled in the art that various changes and modifications can be made therein without departing from the spirit and scope thereof.

What is claimed is:

1. Glass for vehicles consisting essentially of:
   from 65 to 80% by weight of SiO$_2$;
   from 0 to 5% by weight of Al$_2$O$_3$;
   from 0 to 5% by weight of B$_2$O$_3$;
   from 0 to 10% by weight of MgO;
   from 5 to 15% by weight of CaO;
   from 10 to 18% by weight of Na$_2$O;
   from 0 to 5% by K$_2$O;
   from 5 to 15% by weight in total of MgO and CaO;
   from 10 to 20% by weight in total of Na$_2$O and K$_2$O;
   from 0.1 to 1% by weight of cerium oxide in terms of CeO$_2$;
   from 0.2 to 0.6% by weight of iron oxide in terms of Fe$_2$O$_3$,
   wherein iron oxide includes both FeO and Fe$_2$O$_3$;
   0% by weight of CoO;
   0% by weight of NiO; and
   from 0.0005 to 0.005% by weight of Se,
   wherein said glass has an excitation purity $P_e$ of 7.6% or more.

2. Glass for vehicles as claimed in claim 1, wherein the proportion of FeO is from 23 to 35% by weight based on the total iron oxide.

3. Glass for vehicles as claimed in claim 1, wherein the glass with a thickness of 4 mm has a visible light transmission of at least 70% with the CIE standard illuminant A and a dominant wavelength of 570 nm or longer with the CIE standard illuminant C.

4. Glass for vehicles as claimed in claim 3, wherein the glass with a thickness of 4 mm has a solar radiation transmission of not more than 60% and a light transmission of not more than 10% at a wavelength of 350 nm.

5. Glass for vehicles consisting essentially of:
   from 65 to 80% by weight of SiO$_2$;
   from 0 to 5% by weight of Al$_2$O$_3$;
   from 0 to 5% by weight of B$_2$O$_3$;
   from 0 to 10% by weight of MgO;
   from 5 to 15% by weight of CaO;
   from 10 to 18% by weight of Na$_2$O;
   from 0 to 5% by K$_2$O;
   from 5 to 15% by weight in total of MgO and CaO;
   from 10 to 18% by weight in total of Na$_2$O and K$_2$O;
   from 0.1 to 1% by weight of cerium oxide in terms of CeO$_2$;
   from 0 to 1% by weight of TiO$_2$;
   from 0.2 to 0.6% by weight of iron oxide in terms of Fe$_2$O$_3$,
   wherein iron oxide includes both FeO and Fe$_2$O$_3$;
   0% by weight of CoO;
   0% by weight of NiO; and
   from 0.0005 to 0.005% by weight of Se,
   wherein said glass has an excitation purity $P_e$ of 7.6% or more.

6. Glass for vehicles as claimed in claim 5, wherein the proportion of FeO is from 23 to 35% by weight based on the total iron oxide.

7. Glass for vehicles as claimed in claim 5, wherein the glass with a thickness of 4 mm has a visible light transmission of at least 70% with the CIE standard illuminant A and a dominant wavelength of 570 nm or longer with the CIE standard illuminant C.

8. Glass for vehicles as claimed in claim 7, wherein the glass with a thickness of 4 mm has a solar radiation transmission of not more than 60% and a light transmission of not more than 10% at a wavelength of 350 nm.

* * * * *